3,291,313
SUCTION PIPE STRAINER
Wendell W. Davis, % Davis Welding & Blacksmith Shop,
Box 64, St. Paul, Nebr.
Filed Oct. 8, 1963, Ser. No. 314,670
3 Claims. (Cl. 210—354)

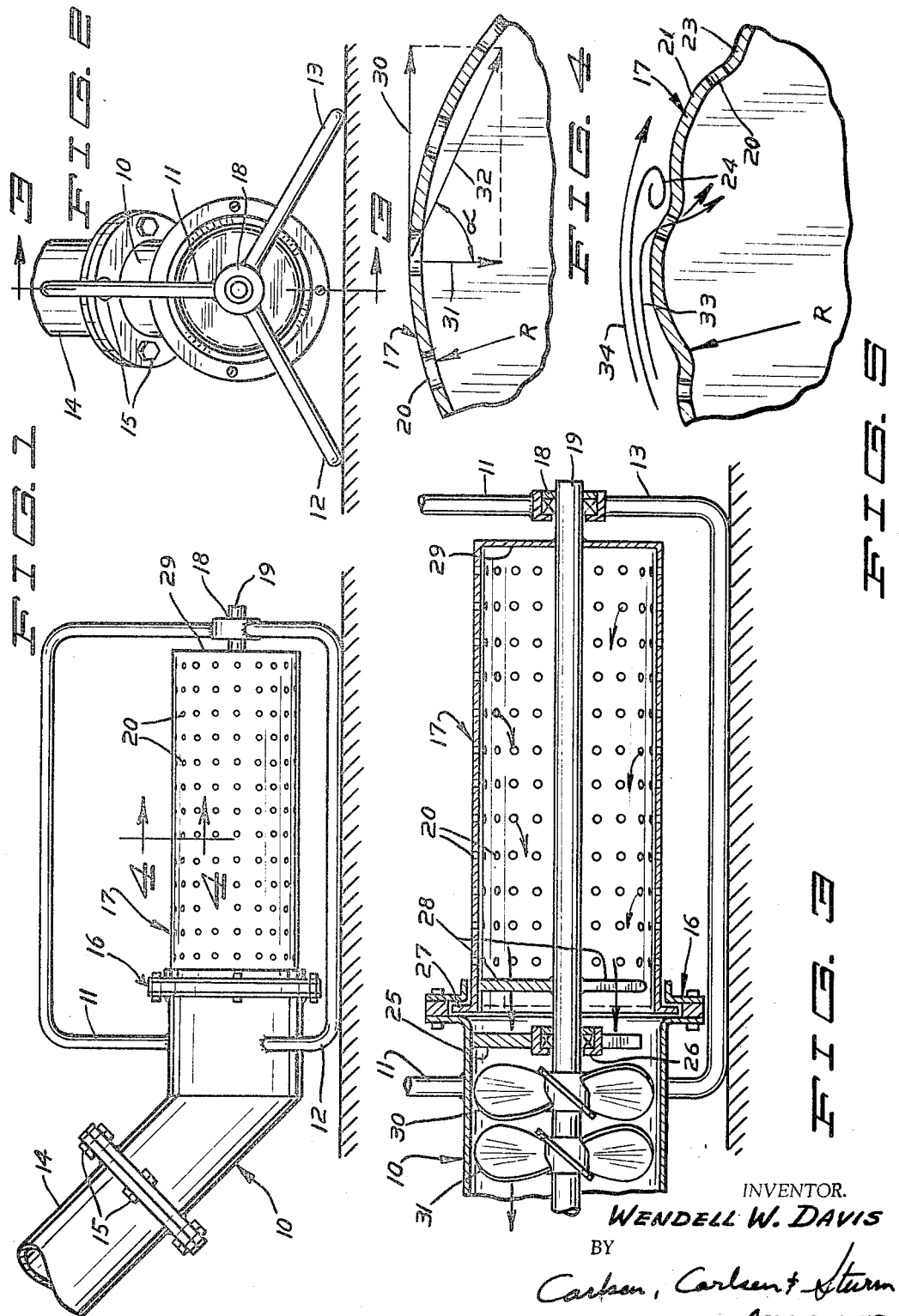

This invention relates generally to strainers and is more particularly directed to self-propelled rotary strainers having a high volume capacity.

The present invention has been observed to provide useful and improved operation in connection with high volume irrigation pumps, fire fighting equipment and the like where water is drawn from sources which may contain a large proportion of debris, trash and/or marine life as, for example, rivers, creeks, sloughs, reservoirs and the like. In many of these applications, it is difficult and undesirable to utilize elaborate and/or powered straining apparatus as in many cases there exists a requirement for efficient operation over long periods of time without the attention of an operator. As will be seen below, my invention fulfills all of these requirements while presenting an uncomplicated reliable device.

It is therefore an object of my invention to provide an improved suction pipe strainer.

It is a still further object of my invention to provide an improved suction pipe strainer which operates with greater efficiency than heretofore obtained without requiring an external source of power.

Another object of my invention is to provide an improved self-cleaning suction pipe strainer which may be easily transported to remote locations and utilized under difficult service conditions.

These and other more detailed and specific objects will be disclosed in the course of the following specification, reference being had to the accompanying drawings, in which—

FIG. 1 is a side elevational view of one embodiment of my invention.

FIG. 2 is an end elevational view of the apparatus shown in FIG. 1.

FIG. 3 is a side sectional view taken along section lines 3—3 in FIG. 2.

FIG. 4 is a fragmentary section taken along section lines 4—4 in FIG. 1.

FIG. 5 is a fragmentary section of a modified embodiment of the showing in FIG. 4.

Referring now to FIGS. 1, 2, 3 and 4 of the drawings, my invention comprises a housing 10, to which is attached a plurality of support and carrying members 11, 12 and 13 which extend radially outwardly and axially of the inlet opening on housing 10 and are joined together at their opposite ends to provide a housing for a bearing member 18. A suitable shaft 19 is journaled in bearing member 18 and in a further bearing member 26 positioned within the inlet to housing 10 which is held in place by suitable support members 25. Impellers 30 and 31 are mounted at the forward end of shaft 19 and within the inlet of housing 10 and a perforated cylindrical straining means is also mounted upon shaft 19 and serves to cover the inlet to housing 10.

Housing 10 is of cylindrical cross section and is angled upwardly at its discharge end for connection to a suction pipe which may be connected to a suitable pump capable of handling a substantial volume of fluid. Strainer 10 and pipe 14 are provided with suitable flanged ends which may be connected by suitable fastening means as, for example, bolt members 15. The inlet end of housing 10 has a radially extending flange upon which is mounted an annular spacer member and a further annular flange which is adapted to coact with a radially extending flange on the end of cylinder 17 to provide a substantially fluid-tight labyrinth seal. Cylinder 17 is provided with a closed end 29 which is attached, as by welding, to shaft 19 and is further supported at its left-hand end through suitable supporting members 28 which may be welded to shaft 19 and to cylinder 17. Cylinder 17 has a plurality of spaced circular perforations around its outer periphery which may extend for the entire length of the cylinder.

In FIG. 4 an enlarged cross-sectional fragment of a portion of the surface of cylinder 17 is shown with radial and tangential vectors 31 and 30 and a resultant vector 32, extending inwardly at an angle $\alpha$ with respect to radial vector 31, superimposed on top of one of the perforations 20. These vectors may be considered as velocity vectors or, for convenience, the velocity vectors may be translated into pressures as will be noted below in connection with the discussion of a specific embodiment of my invention.

It may thus be seen that a housing 10, having an inlet and outlet openings, is provided with a rotating cylindrical strainer that is positioned intermediate the inlet opening and the reservoir from which fluid is to be taken on a shaft which includes suitable means responsive to the flow of fluid through housing 10 from the inlet to outlet openings to rotate cylinder 17 at a velocity proportional to the rate of flow of fluid through the apparatus.

As indicated in FIG. 3, fluid flows inwardly of cylinder 17 through the plurality of perforations 20, through the inlet on housing 10, over and arround the impellers 30 and 31 and is discharged through the outlet opening on housing 10 to pipe 14 and thence proceeds to the pump.

In one operative embodiment of my invention, a cylinder one foot in diameter and eighteen inches in length was utilized and was constructed of a relatively thin perforated sheet metal material having approximately four holes of one-quarter inch diameter per square inch to provide a ratio of approximately four to one between the open and closed surfaces of cylinder 17. This cylinder was designed to be utilized in an application in which the pumping volume desired was approximately 800 gallons per minute. Since the area of the perforations in cylinder 17 is approximately 137 square inches, the inflow velocity of fluid through perforations 20 may be calculated by applying the formula $Q=vA$ which in the present embodiment shows the inflow velocity $v$ to be 1.7 ft./sec. which in turn corresponds to a dynamic radially inwardly directed pressure of 7 lbs./ft.$^2$ and may be considered the vector indicated by reference character 31 in FIG. 4.

The velocity of rotation is related to the pitch of the driving means utilized in the present embodiment and the rate of flow of fluids therethrough and any desired speed of rotation may be achieved by one skilled in the art upon becoming familiar with the principles of my invention. It may be noted that it is desirable to take the effects of viscosity of fluid and friction when designing the impeller driving means. In the present embodiment, the radius of the cylinder is one-half foot and for a frequency of rotation of one R.P.S. a tangential velocity of 314 ft./sec. is obtained. This corresponds to a tangential dynamic pressure of 9.5 lbs./ft.² It may also be noted that for a frequency of two revolutions per second, the tangential velocity is 6.28 ft./sec. which provides a corresponding tangential dynamic pressure of 38.2 lbs./ft.² The tangential velocity and/or dynamic pressure is represented by vector 30 in FIG. 4. The radial and tangential velocities or pressures may be vectorially added to provide a resultant force, or pressure, indicated by vector 32 which is directed at an angle α with respect to a radial center line passing through a perforation 20 and the axis of cylinder 17.

It is desirable to select the radial and tangential components of velocity or force such that the resultant vector is directed at an angle α displaced at least 55 degrees from the inwardly directed flow represented by vector 31. It may be desirable to utilize as large an angle α as may be accommodated, dependent upon the physical characteristics of the cylinder 17 and the size of the perforation 20 and the limit to this may be determined experimentally under actual operating conditions. As the angle α is increased in a direction toward tangential vector 30, a great amount of turbulence may be observed due to the fluid impinging on the side of the perforation. For a perforation size of one-fourth inch as noted above and a thickness of one-sixteenth of an inch for the cylinder, the resultant effective pressure represented by vector 32 should be maintained at an angle α of 76 degrees or less with respect to vector 31. At such an angle, some turbulence does occur and serves to aid in preventing objects from entering the holes. It may also be noted at this point that the direction of vector 32 and its magnitude is such as to tend to eject objects, which may become lodged in the perforations, in an outward direction due to the large component of tangential force or pressure. As stated above, the tangential component of pressure must be larger than the radial component and this may be adjusted by modifying the radius of cylinder 17 and/or the speed of rotation as determined by the rate of flow of fluid through housing 10 and the characteristics of the particular driving means which are rotated by such fluid flow.

It may now be apparent that it is desirable to utilize as thin a material for cylinder 17 as is possible under the normal operating conditions so as to allow a large angle α between vectors 31 and 32. Of course, the thickness of the sheet metal must be great enough to provide the necessary mechanical strength to prevent implosion of the cylinder due to the forces acting thereon. It may also be noted that the effective area of the perforations 20 with respect to objects impingent thereon is substantially reduced by virtue of the direction of resultant vector 32. For example, if the angle α is 60 degrees, the effective exposed perforation area for transmitting fluid therethrough is equal to the area of the perforation multiplied by the cosine of the angle α. The cosine of 60 degrees is one-half and thus the effective perforation area is one-half of the actual area.

It may thus be seen that one skilled in the art may easily utilize the principles of my invention to construct straining apparatus for use with many different forms and types of pumping equipment bearing in mind that the tangential velocity should be substantially greater than the inflow velocity to provide the desirable direction for the resultant velocity of the fluid flow through the perforation.

In the embodiment of FIG. 5, the perforations are fashioned in cylinder 17 through the use of a die, or other punching equipment, that is applied in a manner as to provide upset areas in the surface of cylinder 17. The raised portion 21 immediately precedes an opening, or perforation 20, and a depressed portion 23 immediately follows such perforation. In this embodiment the flow of fluid around and into the cylinder is indicated by the flow lines 34, 24 and 33. It may be noted that turbulence is indicated on flow line 34 in an area immediately following the perforation 21 to tend to provide a means for removing any particles of debris that may be present in proximity to perforation 20.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In combination with a means for inducing a high volume of fluid flow, a high capacity suction strainer comprising in combination;
   (a) a housing having inlet and outlet ports;
   (b) a shaft rotatably disposed in said housing;
   (c) unidirectional driving means mounted on said shaft and disposed intermediate the inlet and outlet ports on said housing, said driving means being operable to rotate said shaft at predetermined angular velocities proportional to the rate of fluid flow therethrough.
   (d) a strainer mounted on said shaft so as to be rotatably disposed over said inlet port, said strainer being of cylindrical configuration and comprised of a solid side wall having a plurality of perforations therethrough and having a radius related to a predetermined rate of fluid flow therethrough to provide rotation of said driving means and said strainer at an angular velocity so that a tangential pressure component at the periphery of said strainer is substantially higher than the radially inwardly directed component of pressure, as caused by rotation and fluid flow respectively, so as to provide a dynamic inwardly directed resultant pressure that is directed at an angle greater than 55 degrees, and means for causing turbulent flow in proximity to the perforations in the strainer and disposed upstream of each of said perforations with regard to the direction of rotation of the strainer, whereby a relatively high component of tangential pressure and a turbulent flow of fluid in proximity to each of said perforations is effective to tend to prevent the accumulation of undesired material on said perforations and to dislodge any such material that may accumulate on said perforations.

2. The apparatus of claim 1 in which the portions of the cylinder wall downstream of each of said perforations are depressed with regard to the direction of rotation of the cylinder to provide a turbulent flow of fluid in proximity to each of said perforations in the cylinder.

3. In a high capacity suction strainer of the class adapted to be connected to a means for inducing a high volume of fluid flow therethrough, the combination comprising;
   (a) a housing having inlet and outlet ports;
   (b) a strainer rotatably disposed over said inlet port, said strainer comprising a solid walled cylinder having alternate raised and depressed portions therein, a plurality of perforations in said cylinder located only between the outermost extremities of the raised portions and the innermost extremity of the depressed portions, each perforation further being located downstream of the outermost extremity of its respective raised portion with respect to the direction of rotation of said cylinder whereby a turbulent flow of fluid is caused in proximity to said perforation upon rotation thereof; and
   (c) driving means disposed intermediate the inlet and outlet ports of said housing and drivingly connected to said strainer, said driving means being responsive to a predetermined high volume of induced fluid flow through said housing to rotate said strainer, said driving means and said perforations being so constructed and arranged to provide a tangential pressure component at the periphery of said strainer that is substantially higher than the radially inwardly directed component of pressure provided by said fluid flow whereby the fluid flow in proximity to the perforations in said strainer is effective to tend to prevent the accumulation of undesired material thereon and to dislodge any such material that may accumulate on said perforations.

References Cited by the Examiner

UNITED STATES PATENTS

| | | | |
|---|---|---|---|
| 383,493 | 5/1888 | Sargent | 210—497 X |
| 664,833 | 1/1901 | Collins | 210—460 X |
| 827,780 | 8/1906 | Benoit | 210—354 X |
| 869,558 | 10/1907 | Durbrow | 210—250 X |
| 969,364 | 9/1910 | Grootenhuis | 210—354 |
| 2,100,482 | 11/1937 | Irwine | 210—354 |
| 2,101,211 | 12/1937 | Britton | 210—354 X |
| 2,443,781 | 6/1948 | Zacher | 210—250 X |
| 2,672,983 | 3/1954 | Blau | 210—354 |
| 2,678,133 | 5/1954 | Thayer et al. | 210—360 |

REUBEN FRIEDMAN, *Primary Examiner.*

J. DE CESARE, *Assistant Examiner.*